(12) United States Patent
Ramsey et al.

(10) Patent No.: US 7,640,162 B2
(45) Date of Patent: Dec. 29, 2009

(54) SEMANTIC CANVAS

(75) Inventors: William D. Ramsey, Redmond, WA (US); Christopher C. McConnell, Redmond, WA (US); David Dawson, Seattle, WA (US); Jonas Barklund, Kirkland, WA (US); Steven W. Ickman, Redmond, WA (US); Thomas M. Laird-McConnell, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 582 days.

(21) Appl. No.: 11/011,811

(22) Filed: Dec. 14, 2004

(65) Prior Publication Data

US 2006/0129379 A1 Jun. 15, 2006

(51) Int. Cl.
*G10L 11/10* (2006.01)
(52) U.S. Cl. ............... 704/270; 704/270.1; 704/275
(58) Field of Classification Search ............ 704/9, 704/8, 7, 257, 270.1, 275
See application file for complete search history.

(56) References Cited

U.S. PATENT DOCUMENTS

| | | | |
|---|---|---|---|
| 5,884,249 A * | 3/1999 | Namba et al. ............ 704/9 |
| 7,137,126 B1 * | 11/2006 | Coffman et al. ............ 719/328 |
| 7,216,351 B1 * | 5/2007 | Maes ............ 719/328 |
| 7,225,131 B1 * | 5/2007 | Bangalore et al. ............ 704/270 |
| 7,415,537 B1 * | 8/2008 | Maes ............ 709/246 |
| 2003/0046316 A1 | 3/2003 | Gergic | |

FOREIGN PATENT DOCUMENTS

| CN | 2005101250344 | 11/2005 |
|---|---|---|
| EP | 1 100 013 | 5/2001 |

OTHER PUBLICATIONS

European Search Report.
Chinese Office Action.

* cited by examiner

*Primary Examiner*—Richemond Dorvil
*Assistant Examiner*—Matthew H Baker
(74) *Attorney, Agent, or Firm*—Westman, Champlin & Kelly, P.A.

(57) ABSTRACT

A system for synchronizing a natural language input element and a graphical user interface has a synchronization engine. The synchronization engine is adapted to monitor user interactions with the natural language input element and the graphical user interface and to synchronize the natural language input element and the graphical user interface responsive to the user interactions.

9 Claims, 7 Drawing Sheets

SEMANTIC CANVAS

BACKGROUND OF THE INVENTION

The present invention relates to natural language processing, and more particularly, to synchronization of natural language input and graphical user input in a graphical user interface.

Graphic user interface (GUI) applications perform well in most tasks, in part, because the GUI provides options which relate directly to functionality available within an application and from which the user may select what he/she wants to do. However, GUI applications can sometimes be difficult to use. For example, in some instances, the functionality requires opening many sub-dialog boxes, which may not be intuitive for a user. Additionally, many steps may be required to fill in the GUI elements with the proper information. GUI elements may include pull down or pop up menus, check boxes, radio buttons, text or other types of data input fields, and so on. Moreover, the user may not know where to find available options within the GUI. With small devices (such as hand-held devices, personal digital assistants, wireless phones with networking capabilities, and so on), entry of the information into the GUI may be difficult. Finally, handicapped individuals may have difficult navigating and completing a GUI form, for example.

To overcome some of the limitations associated with GUIs, natural language applications have been developed, which can allow a user to easily express concepts that would be fairly complex in a GUI. For example, in natural language, a user may request "Find all emails to Bill that I sent last week", "Change the screen resolution to 1280×1024", "where is the web page about Microsoft Corporation", "Please delete all unread emails", and so on. Each such utterance is readily understandable, but may add multiple layers of complexity in completing a GUI form.

However, there are some problems with NL applications, such as discoverability, confusion, dead-end, and training problems. Discoverability refers to situations where the user is unaware of what he/she can do in the program. Confusion refers to problems that arise when users do not understand how the application interpreted a particular text input. A dead-end refers to a situation where the software program provides no option or mechanism for the user to alter what he/she intended. Finally, there is no mechanism to train the user how to utilize NL input.

There is ongoing need for intuitive user interfaces for improved user-program interaction. Embodiments of the present invention provide solutions to these and other problems and provide advantages over existing semantic authoring tools.

SUMMARY OF THE INVENTION

A system for synchronizing a natural language input element and a graphical user interface has a synchronization engine. The synchronization engine is adapted to monitor user interactions with the natural language input and the graphical user interface and to synchronize the natural language input element and the graphical user interface responsive to the user interactions.

DETAILED DESCRIPTION OF ILLUSTRATIVE EMBODIMENTS

According to an embodiment of the present invention, a synchronization engine synchronizes GUI elements of a user interface (such as check boxes, pull down menus, radio buttons, text fields, and the like) with a natural language text input of the user interface. Specifically, the synchronization engine monitors for user interactions with a natural language text input field and responsively updates the user interface with corresponding GUI elements if changes are detected. Similarly, the synchronization updates the natural language text if changes to the GUI elements are detected.

By synchronizing GUI elements to natural language text inputs, and vice versa, the user receives immediate feedback with respect to a selected input. The relationship between the GUI elements and the natural language input provides an intuitive training mechanism whereby the user can learn how the application operates via visual feedback.

Figure 1:
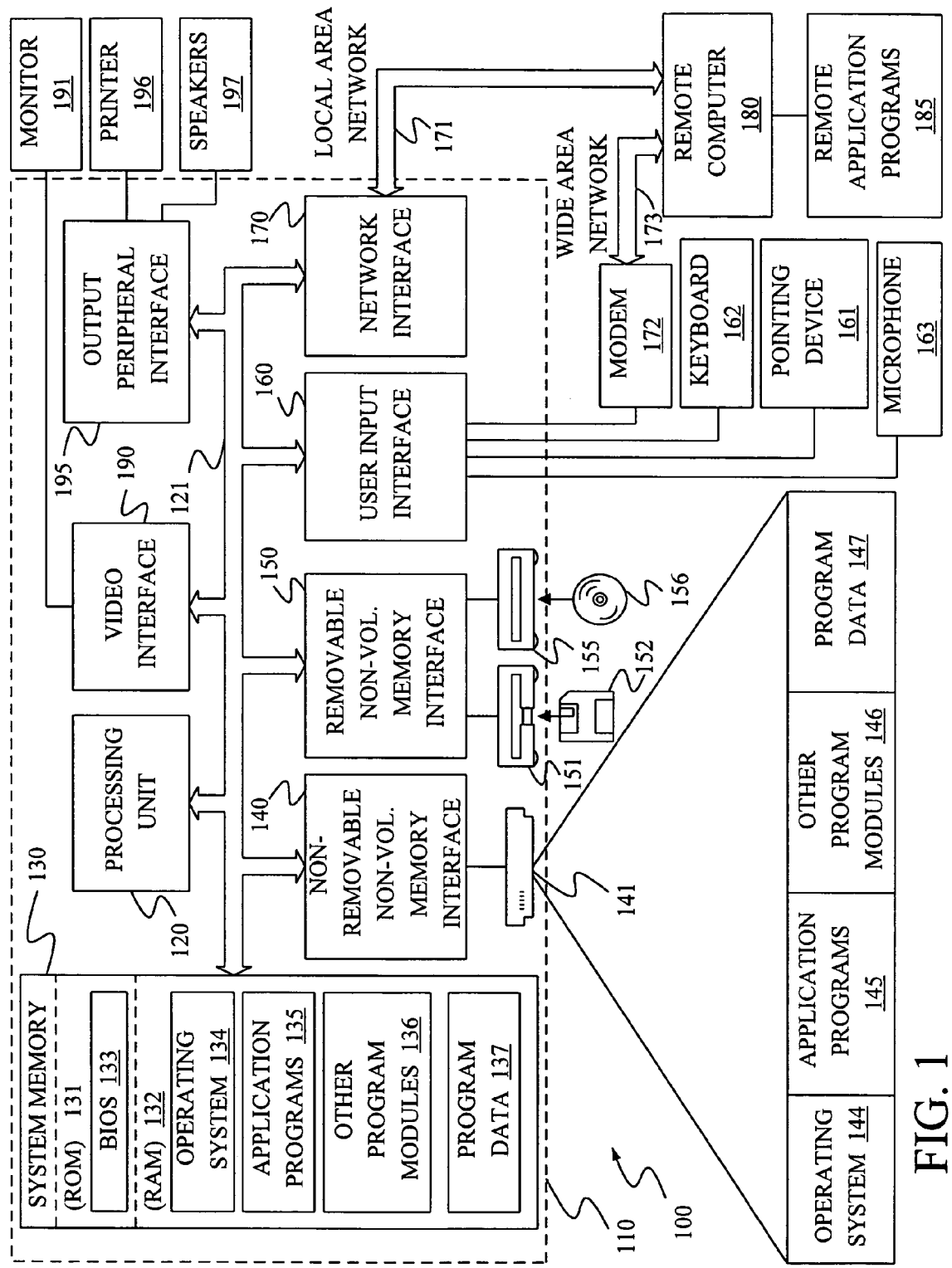
FIG. 1 is a diagrammatic view of a computing system environment on which an embodiment of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
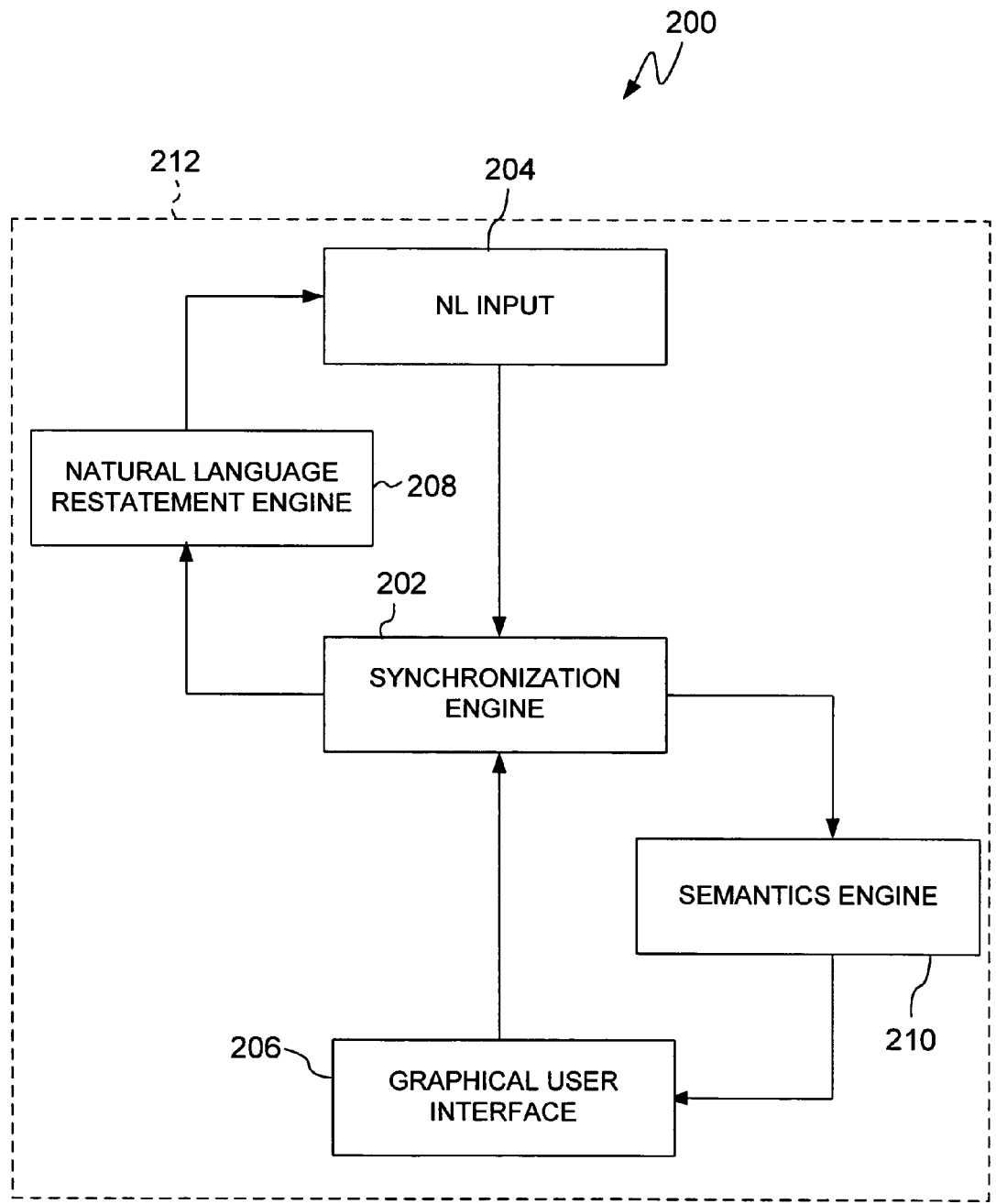
FIG. 2 is a simplified block diagram of a system for synchronizing natural language and GUI inputs according to an embodiment of the present invention.

FIG. 2 is a simplified block diagram of a synchronization (semantic canvas) system 200 according to an embodiment of the present invention. The synchronization system 200 has a synchronization engine 202 communicatively coupled between a natural language (NL) input element 204 and a graphical user interface (GUI) 206. Generally, the NL input element 204 is an element adapted to receive a text string or speech input. The NL input element 204 allows the user to type or enter data (such as by speaking) in complete or partial sentences and intents, such as "find all emails that I sent to Joe last week". The NL input element 204 can be a any mechanism for accepting such user input. The NL input element 204 can include a speech-to-text function (not shown) and can be adapted to receive speech input and to digitize such input into text. The GUI 206 is comprised of one or more functional elements (such as pull down menus, text fields, check boxes, fields within an application domain, and so on). The GUI 206 allows the user to explicitly build his or her intent from objects within the GUI. For example, for the intention of finding all emails sent to Joe from Bill last week, the user can utilize the GUI 206 to select "email" under items to find. The user can then use the GUI 206 to add a condition, such as "sent to" and add "Joe" as the value. Finally, the user can add another condition, such as "date sent" and the like. Generally, the GUI 206 and the NL input element 204 are adapted to perform the same function, such as a find function. A user can find an object or an entity on, for example, a computer hard disc either by selecting one or more functional elements of the GUI 206 and entering appropriate condition information or by entering a query in the NL input element 204.

The synchronization engine 202 is a module adapted to respond to changes in the NL input line 204 and to update the GUI 206 accordingly. The synchronization engine 202 is also adapted to respond to changes in the GUI and to update the NL input line to reflect what the user typed. The synchronization engine 202 utilizes an NL restatement engine 208 to translate selected functional elements of the GUI 206 to natural language text input in the NL input element 204. The synchronization element 202 utilizes a semantics engine 210 to convert natural language input from the NL input element 204 to functional elements in the GUI 206. The synchronization engine 202 is adapted to monitor for changes to the data in the NL input element 204 or changes to selected functional elements of the GUI 206 and to update the other with the appropriate changes, such that the NL input element 204 and the GUI 206 are synchronized.

The functional elements of the semantic canvas system 200 can be implemented within a single application (as indicated by dashed line 212). Alternatively, functional elements of the semantic canvas system 200 can be implemented in more than one application and adapted to communicate to provide the synchronization.

In general, the NL input to the NL input element 204 can be in any cognizable form. In one embodiment, the NL input element 204 is adapted to receive text or speech input. As used herein, the term "NL input" refers to any data input in a natural language format. As used herein, the term "natural language" refers to input that parallels the way that a person normally speaks, as opposed to computer languages, artificial languages, or constrained or controlled vocabularies. As used herein, the terms "text input", "NL input" and "speech input" can be understood to be interchangeable with respect to inputs to the NL input element 204.

Figure 3:
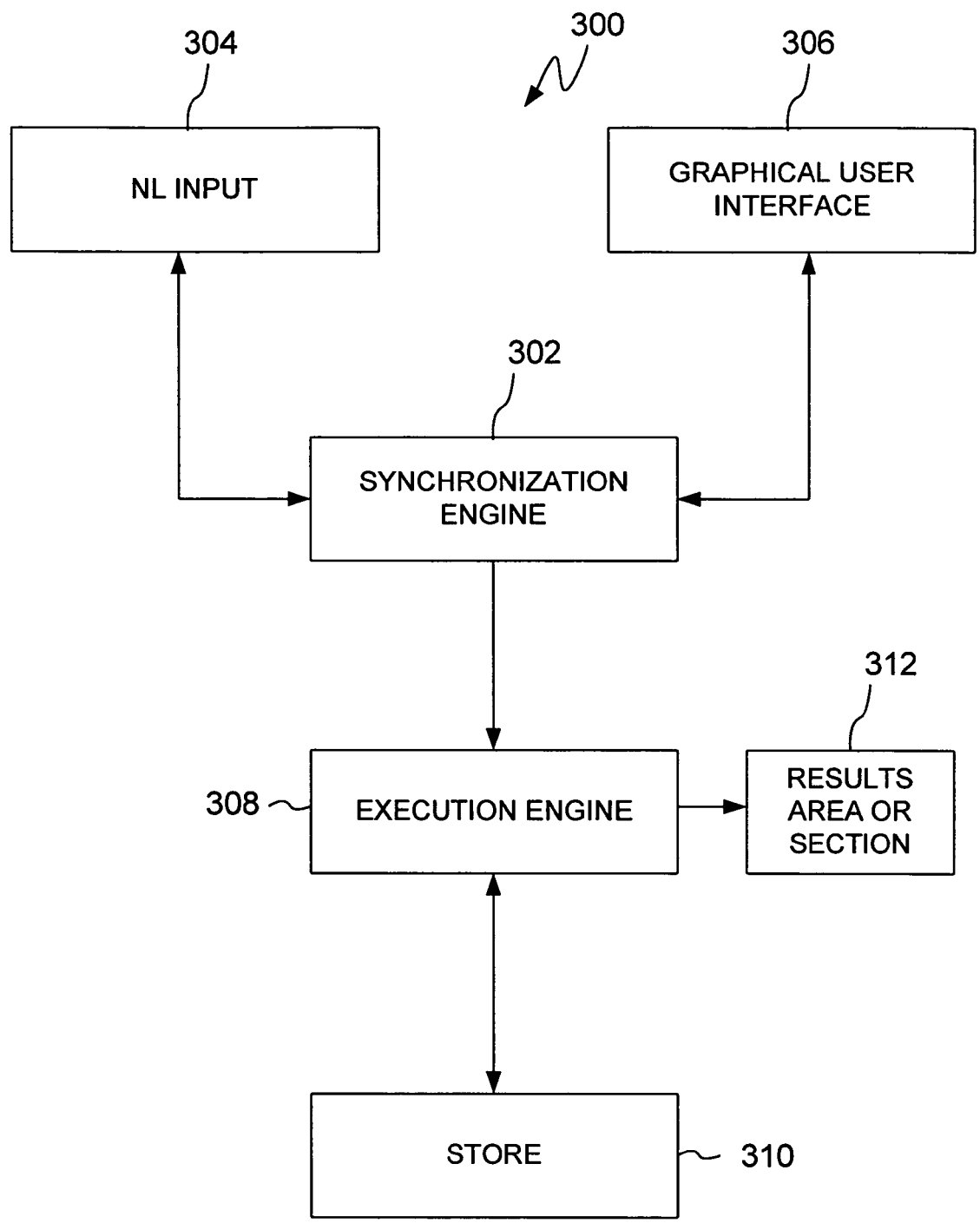
FIG. 3 is an expanded simplified block diagram of a portion of a system for synchronizing natural language and GUI inputs according to an embodiment of the present invention.

FIG. 3 is an expanded block diagram of a portion of a synchronization system 300 according to an embodiment of the present invention. In this implementation, the underlying semantics of the synchronization engine are converted to a query syntax, such as SQL, hitting a database, and returning the results. However, it is possible for the application to perform the tasks or searches any number of ways, either directly from the GUI, from the NL input, or from some intermediate representation.

The synchronization system 300 has a synchronization engine 302 that is communicatively coupled between an NL input 304 and a GUI 306. Additionally, the synchronization engine 302 is communicatively coupled to an execution engine 308 and a data store 310. The execution engine 308 performs an operation on the data in the data store 310 based on the text input of the NL input 304 or functional element selection of the GUI 306, and returns the results to a results area 312 of the user interface.

The NL input 304 allows a user to type in his/her intention (such as "Find all email from Bob"). The NL input 304 notifies the synchronization engine 302 when changes occur. The GUI 306 allows the user to manually build and alter his/her intention from functional elements, such as pull down menus and the like). The GUI 306 notifies the synchronization engine 302 when changes occur. The synchronization engine 302 is adapted to automatically build the functional elements in the GUI 306 when the user enters text in the NL input 304. The synchronization engine 302 is also adapted to automatically update the text in the NL input 304 in response to changes in the GUI 306. In either case, the synchronization engine 302 notifies the respective element (NL Input 304 or GUI 306) of the changes.

Thus, the synchronization engine 302 leverages the strengths of the GUI 306 and the NL input 304, while overcoming limitations of both. Between the NL input 304 and the GUI 306, the synchronization system 300 implemented in a user interface provides mechanisms to easily allow the user to express what he or she wants to do, to show what he/she could have done in either the GUI 306 or the NL input 304, and to alter the expression in either place. The system 300 provides a means for built-in training and discoverability.

In one embodiment, the execution engine 308 is notified of changes by the synchronization engine 302. The execution engine 308 constructs an SQL-like query, for example, and fetches the results from the store 310. The execution engine 308 then passes the results to the results area 312 (or application) for display.

One implementation of this approach converts the underlying semantics in the synchronization engine 302 to a query syntax such as SQL, hitting a database 310, and returning the results to a display area 312.

The synchronization engine can be implemented efficiently using a semantic engine with an authored schema and annotation set. Alternatively, an application can implement all of the logic for translating between NL and the GUI and back.

Figure 4:
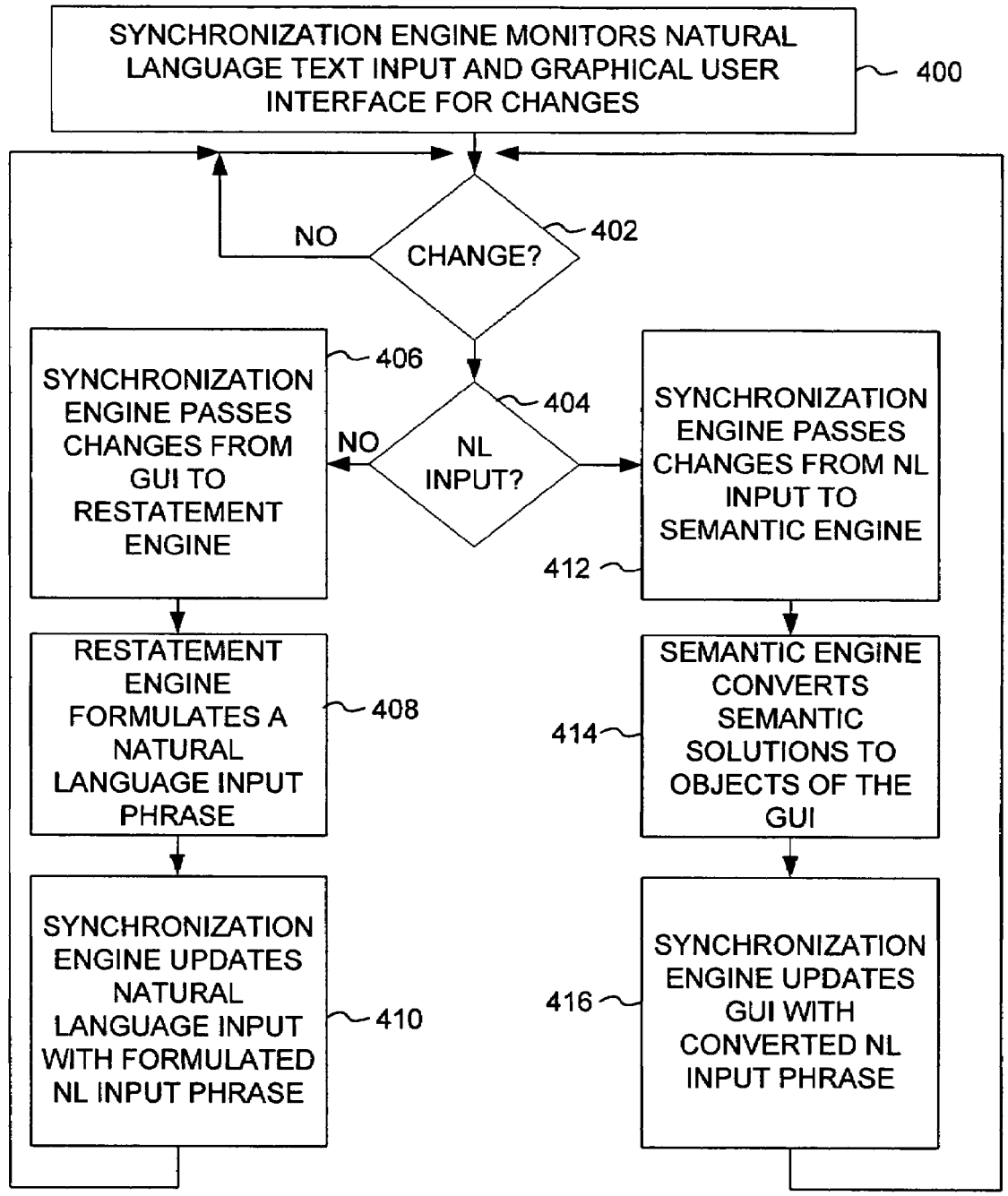
FIG. 4 is a simplified flow diagram illustrating a method of synchronizing the GUI and the natural language input according to an embodiment of the present invention.

FIG. 4 is a simplified block diagram of a method of synchronizing a GUI and a natural language text input of a user interface according to an embodiment of the present invention. The synchronization engine monitors the GUI and the natural language text input for changes (block 400). If there are no changes (block 402), the synchronization engine continues to monitor the GUI and the natural language text input until a change is detected. If a detected change is not to the NL input (block 404), the synchronization engine passes changes from the GUI to a restatement engine (block 406). The restatement engine formulates a NL input phrase (block 408). The synchronization engine then updates the natural language input with the formulated NL input phrase (block 410). The synchronization engine then continues to monitor the NL input and the GUI for changes (block 400).

If a detected change is to the NL input (block 404), the synchronization engine passes changes from the NL input to the semantic engine (block 412). The semantic engine converts semantic solutions to objects of the GUI (block 414). The synchronization engine updates the GUI with the converted NL input phrase (block 416). The synchronization engine then continues to monitor the NL input and the GUI for changes (block 400).

Figure 5:
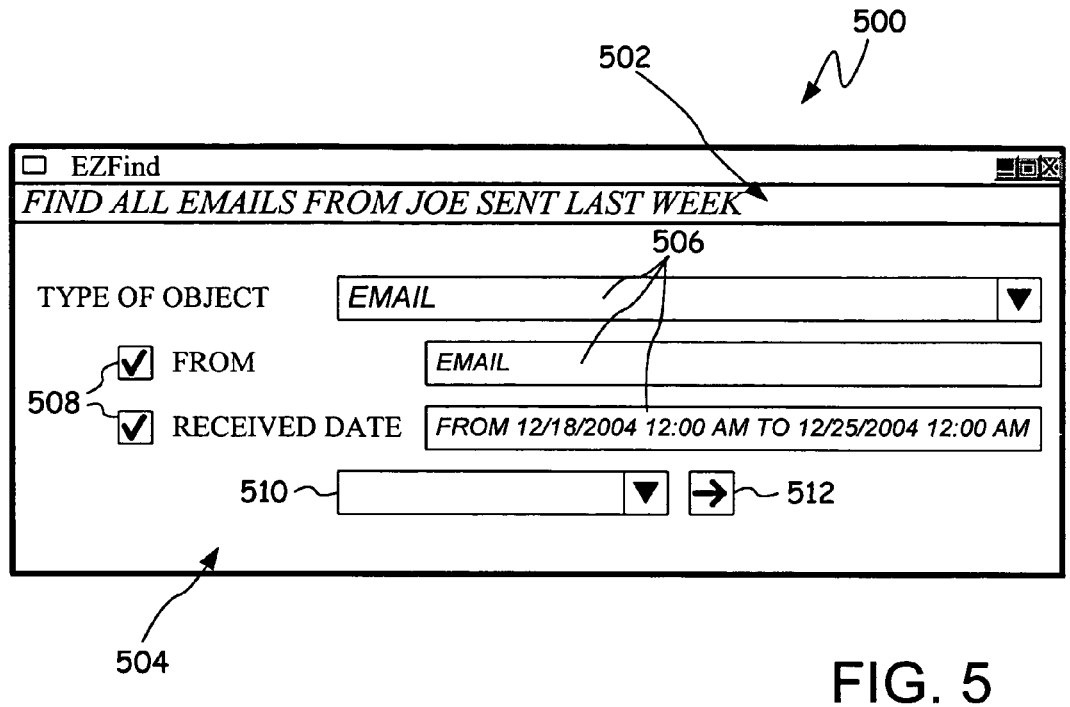
FIG. 5 is a screen depiction of a Find application with natural language input and GUI input elements, where some of the GUI elements have been automatically constructed from the natural language input according to an embodiment of the present invention.

FIG. 5 is a screen depiction of a Find application 500 with natural language input element 502 and GUI 504 with input elements or GUI objects, such as pull-down menus 506, text fields 508, check boxes 510, and buttons 512. Some of the GUI objects (506-512) have been automatically constructed from the natural language input to the natural language input element 502 according to an embodiment of the present invention. In this instance, the user has typed "find all emails from Joe sent last week" in the NL input 502, and the synchronization engine updated the GUI with a plurality of GUI objects 506-512 reflecting what the user typed. The synchronization engine (in conjunction with a semantic engine) set the type of object to "email". Additionally, the synchronization engine built two conditions: "from" is set to "Joe" and "received date" is set equal to the correct date range. Thus, the synchronization engine allows the user to see exactly how the NL input was processed and how the application interpreted the input.

Figure 6:
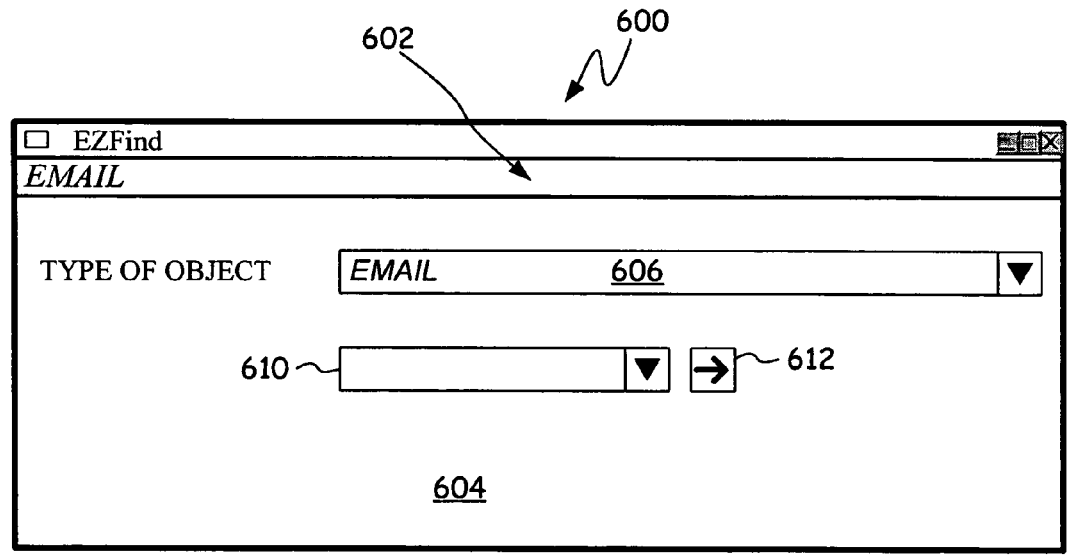
FIG. 6 is a screen depiction of a Find application with natural language input and GUI input elements, where the input line has been updated based on a selected GUI element, according to an embodiment of the present invention.
Figure 7:
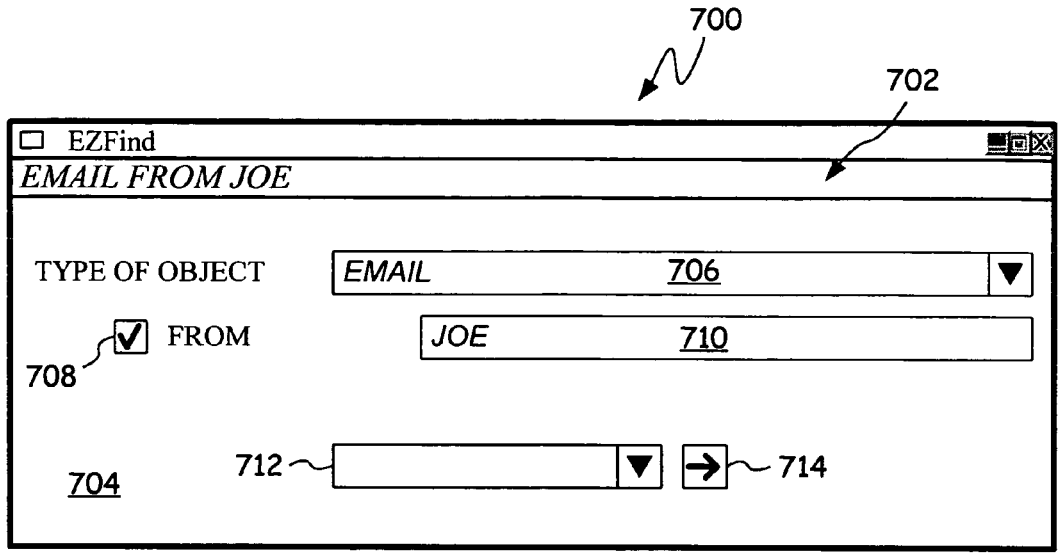
FIG. 7 is a screen depiction of the Find application of FIG. 6 after a "From" condition is added via a selected GUI element according to an embodiment of the present invention.
Figure 8:
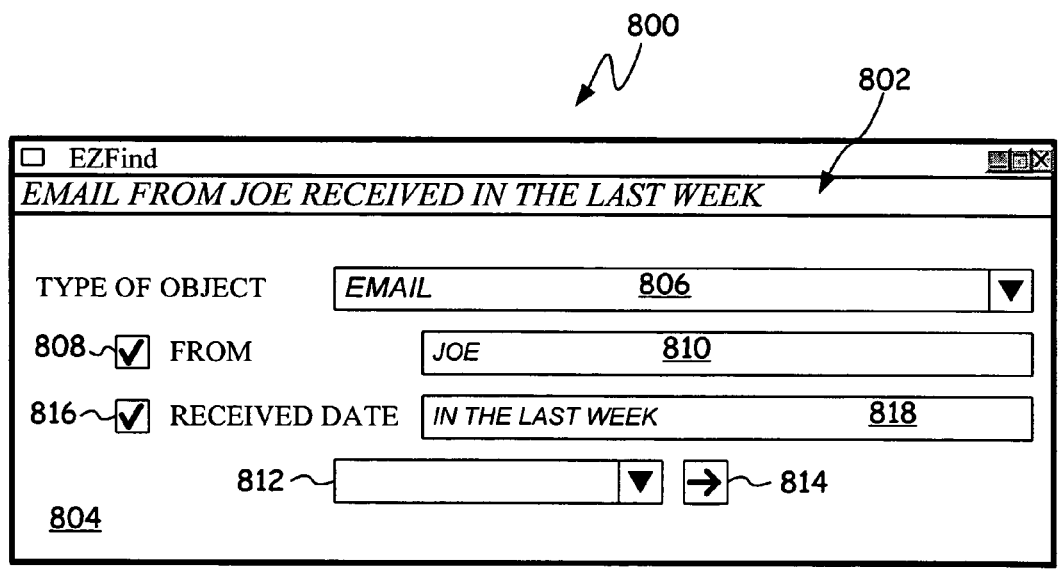
FIG. 8 is a screen depiction of the Find application of FIG. 7 after date condition is added via a selected GUI element according to an embodiment of the present invention.

FIGS. 6-8 depict an alternative approach where the user's intent is built using only the GUI, and the synchronization composes the NL input to correspond to the GUI. In FIG. 6, a Find application 600 includes an NL input field 602 and a GUI 604. The user selects "email" from a pull-down list 606. After selecting "email", the synchronization engine automatically updates the NL input field 602 with the term "email", since the user could have typed "email" to create the same intent. Alternatively, after selecting "email", the user can click a button 612, thereby causing the synchronization engine to update the NL input field 602. Once the user makes a selection, the application 600 adds an additional GUI object 610 (a pull down menu in this instance) for additional user selections.

FIG. 7 is a screen depiction of the Find application of FIG. 6 after a first condition is added. The application 700 includes a NL input field 702 and a GUI 704. The user selects "email" from a type of object pull-down list 706. Based on the selection, the GUI 704 can display one or more conditional options, such as "To", "From", "Received Date" and the like. Alternatively, the user can select a conditional option or other input element using pull-down menu 712. In this instance, the user selects "from" using the pull-down menu 712, and the application 700 adds checkbox 708 and associated text field 710 to the GUI 704, either automatically or based on the user interaction with button 714. The user inputs the term "Joe" in the text field 710. Consequently, the synchronization engine updates the NL input field 702 with a NL representation of the selected GUI objects, resulting in an NL interpretation of the GUI 704 as "email from Joe".

FIG. 8 is a screen depiction of the Find application of FIG. 7 after a date condition is added. The application 800 includes a NL input field 802 and a GUI 804. The user selects "email" from a type of object pull-down list 806. Based on the selection, the GUI 804 either displays one or more conditional options, such as "To", "From", "Received Date" and the like, or the user selects a conditional option from pull-down menu 812. The application 800 either automatically or based on user interaction with button 814. The application adds checkbox 808 and associated input field 810 to the GUI 804. In this instance, the user selects a second conditional option using pull-down menu 812, resulting in date checkbox 816 and associated date field 818. The user selects one or more of the options and fills in the associated fields. In an alternative embodiment, associated field 818 may be a pull down menu with various date options such as "yesterday", "last week", "last month", and so on. The synchronization engine updates the NL input field 802 with a natural language interpretation of the selected elements 806 and 808 of the GUI 804, resulting in "email from Joe received in the last week".

It is important to note that there are many ways to express the same concept using natural language. There is inherent ambiguity in any natural language input, which must be resolved with reasonable certainty by the semantic engine, and in this case, the synchronization engine.

Figure 9:
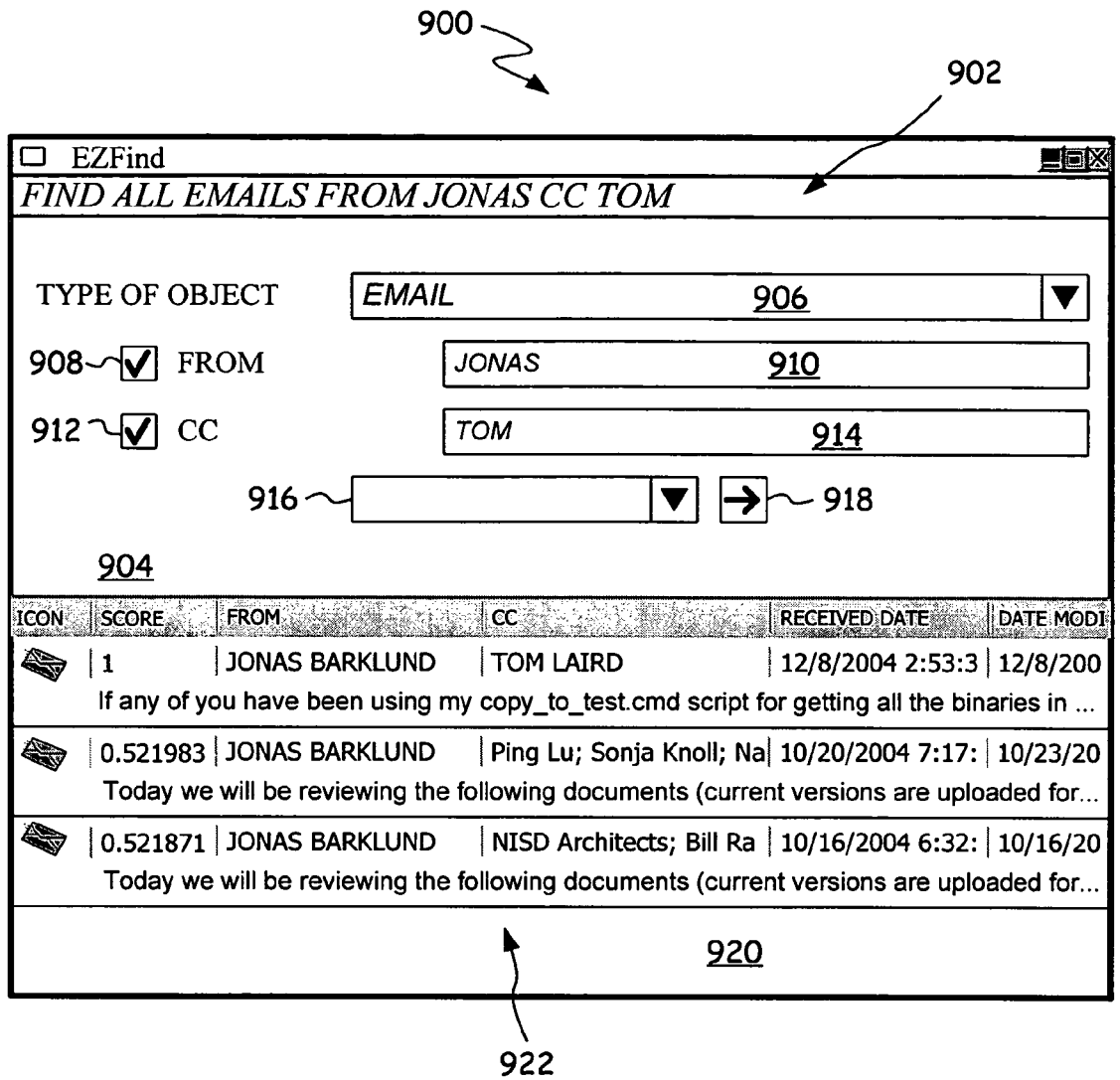
FIG. 9 is a screen depiction illustrating the Find application of FIG. 7 after a "carbon copy" condition is added via a GUI element and after the query is performed according to an embodiment of the present invention.

FIG. 9 is a screen depiction illustrating a different search using the Find application 900 after a "carbon copy" condition is added via a GUI element. The application 900 includes a NL input 902 and a GUI 904. The user selects "email" from a GUI object pull-down list 906. The user can then select one or more conditional options using pull-down menu 916, which provides selection options based on the context. For example, since the user selected "email", the conditional options include application elements associated with email, such as "To", "From", "Received Date" and the like. The user selects one or more of the options (in this instance "From" and "CC" using pull-down menu 916, causing the application to add the selected GUI objects 908 and 912 and their associated input fields 910 and 914, respectively. The user fills in the associated fields 910 and 914. The synchronization engine updates the NL input field 902 with a natural language interpretation of the selected GUI elements 908 and 912 and their associated input fields 910 and 914. In this instance, the application 900 can interact, for example, with an execution engine (such as execution engine 308 in FIG. 3), which executes the search based on the user's input. The execution engine searches a database and returns a list of results for display in a display area 920 of the application 900. The display area 920 can be populated with a list of found items 922. In the case of "find all emails from Jonas CC Tom", the application should show all of the emails that Jonas sent where Tom was copied by "cc". In this instance, there are only three emails that fit these criteria.

While the above discussion has largely focused on a standalone type application, it should be understood that the synchronization feature can be incorporated into a larger application. The synchronization of the GUI objects with natural language input provides the user with insights into how the application interprets natural language. Additionally, the synchronization feature serves as a means for training a user about available options within an application. Finally, the synchronization serves as an error checking feature to allow a user to correct errors in a query, which are made obvious by the application's interpretation of the user selections. This immediate feedback not only renders the application more intuitive for the user, but also allows the user to become more efficient by correcting misinterpretations, of which the user might otherwise be unaware.

Although the present invention has been described with reference to particular embodiments, workers skilled in the art will recognize that changes may be made in form and detail without departing from the spirit and scope of the invention.

What is claimed is:

1. A system for synchronizing a natural language input element and a graphical user interface element, the system comprising:

the natural language input element, wherein the natural language input element displays, via a display device, an indication of a user natural language input on a user interface, wherein the displayed indication of the user natural language input is a representation of words included within an initial natural language input received from a user, and wherein the displayed indication of the user natural language input is displayed in an editable format that allows the user to modify the representation of words included within the initial natural language input by adding words to or removing words from the representation of words included within the initial natural language input;

the graphical user interface element, wherein the graphical user interface element displays, via a display device, on the user interface simultaneously with the display of the indication of the user natural language input, an indication of a user graphical interface input, wherein the displayed indication of the user graphical interface input is an automatically generated control box representation of the initial natural language input received from the user, the displayed indication of the user graphical interface input and the displayed indication of the user natural language input being two different representations of the same initial natural language input received from the user, and wherein the displayed indication of the user graphical interface input is an editable format that allows the user to modify the automatically generated control box representation of words included within the initial natural language input;

a synchronization engine that monitors, via a processor, user interactions with the natural language input element and the graphical user interface element and automatically synchronizes the natural language input element and the graphical user interface element responsive to the user interactions, wherein the synchronization engine automatically synchronizes the natural language input element and the graphical user interface element responsive to the user interactions by automatically changing the displayed indication of the user graphical interface input so as to automatically modify the automatically generated control box representation so as to alter the automatically generated control box representation to incorporate revised logic that is consistent with an edit made to the representation of words included within the initial natural language input, the edit being a word added to or removed from the representation of words included within the initial natural language input; and a restatement engine that monitors user interactions with the graphical user interface element and utilizes a computer processor that is a component of a computing device to automatically compose a natural language input representative of a modification to the automatically generated control box representation of the initial natural language input received from the user, wherein the modification alters the logic of the displayed representation, and wherein the synchronization engine updates the natural language element so as to automatically respond to the modification to the automatically generated representation by automatically substituting a display of the automatically composed natural language input for the displayed representation of words included within the initial natural language input received from the user, wherein the automatically composed natural language input is an automatically generated re-statement of the displayed representation of words included within the initial natural language input received from the user with modifications being automatically made to the displayed representation of words based directly on the modification to the displayed representation.

2. The system of claim 1, wherein the system further comprises:

a semantic engine that generates a mapping of components of the representation of words included within the initial natural language input to components of the automatically generated representation of the initial natural language input, wherein said step of automatically synchronizing further comprises automatically modifying the automatically generated control box representation based at least in part on references to the mapping.

3. The system of claim 1, wherein the system further comprises:

an execution engine that performs an operation on a data store, the scope of the operation being defined at least in part upon the automatically generated re-statement of the displayed representation of words included within the initial natural language input received from the user.

4. The system of claim 3, wherein the operation comprises a query, and wherein the execution engine retrieves and displays a list of results from a collection of stored data, the scope of the list of results being determined, by a query processing engine, to be in line with the automatically generated re-statement of the displayed representation of words included within the initial natural language input received from the user.

5. The system of claim 1, wherein when the synchronization engine performs said step of synchronizing the natural language input element responsive to user interactions, said step of automatically changing the displayed indication of the user graphical interface is performed automatically in response to the user interactions.

6. The system of claim 1, wherein the displayed indication of the user graphical interface input is an automatically generated control box representation that includes at least one drop box control containing an entry indicative of an element of the initial natural language input received from the user.

7. The system of claim 1, wherein the displayed indication of the user graphical interface input is an automatically generated control box representation that includes at least one check box control containing an entry indicative of an element of the initial natural language input received from the user.

8. The system of claim 1, wherein the displayed indication of the user graphical interface input is an automatically generated control box representation that includes a series of text boxes that each contain an entry such that, collectively, the text boxes represent multiple elements of the initial natural language input received from the user.

9. The system of claim 1, wherein the displayed indication of the user graphical interface input is an automatically generated control box representation that includes a series of text and check boxes that each contain an entry such that, collectively, the text and check boxes represent multiple elements of the initial natural language input received from the user.

* * * * *